(12) United States Patent
Magee et al.

(10) Patent No.: US 9,286,120 B2
(45) Date of Patent: Mar. 15, 2016

(54) RESOURCE MANAGEMENT WITH DYNAMIC RESOURCE BUDGETING

(75) Inventors: James M. Magee, Orlando, FL (US); Russell A. Blaine, Santa Clara, CA (US); Umesh S. Vaishampayan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 13/600,116

(22) Filed: Aug. 30, 2012

(65) Prior Publication Data

US 2013/0332936 A1    Dec. 12, 2013

Related U.S. Application Data

(60) Provisional application No. 61/657,523, filed on Jun. 8, 2012.

(51) Int. Cl.
G06F 9/50 (2006.01)
G06F 9/455 (2006.01)

(52) U.S. Cl.
CPC ............ *G06F 9/50* (2013.01); *G06F 2209/504* (2013.01)

(58) Field of Classification Search
CPC ................................ G06F 9/45533; G06F 9/50
See application file for complete search history.

(56) References Cited

U.S. PATENT DOCUMENTS

| 7,257,580 | B2 * | 8/2007 | Kumar |
| 7,322,034 | B2 | 1/2008 | Crawford, Jr. et al. |
| 7,836,452 | B2 * | 11/2010 | Taylor ........................ 718/104 |
| 8,091,088 | B2 | 1/2012 | Kishan et al. |
| 2004/0193703 | A1 * | 9/2004 | Loewy et al. ................ 709/220 |
| 2008/0114635 | A1 | 5/2008 | Shigeta et al. |

* cited by examiner

*Primary Examiner* — Camquy Truong
(74) *Attorney, Agent, or Firm* — Blakely, Sokoloff, Taylor & Zafman LLP

(57) ABSTRACT

A method for resource management of a data processing system is described. According to one embodiment, a request is received via a programming interface from a program to modify a resource budget assigned to the program, where the resource budget specifies an amount of resources of the data processing system the program can utilize during an execution of the program. It is determined whether the program is entitled to modify the resource budget based on entitlement associated with the program. The resource budget for the program is modified if it is determined the program is entitled to modify the resource budget and the modified resource budget is enforced against the program during the execution of the program.

24 Claims, 5 Drawing Sheets

RESOURCE MANAGEMENT WITH DYNAMIC RESOURCE BUDGETING

RELATED APPLICATIONS

This application claims the benefit of U.S. Provisional Patent Application No. 61/657,523, filed Jun. 8, 2012, which is incorporated by reference herein in its entirety.

FIELD OF THE INVENTION

Embodiments of the present invention relate generally to data processing systems. More particularly, embodiments of the invention relate to resource management of data processing systems.

BACKGROUND

As more and more services are becoming available for small or mobile devices, the number of applications running in a single device has increased significantly. Usually, a small or mobile device is used mostly for certain specific applications, while being equipped with general purpose computing capabilities. For example, it is common to find a mobile phone device that also runs a browser application, a gaming application, and a media player application, etc. On the other hand, a mobile video player device may run a gaming application and/or an email application in addition to a video application. Normally, multiple applications or processes in the same device compete with each other by sharing the same memory resources embedded inside the device.

These applications or processes consume resources of the device, such as central process units (CPUs), memory, input/output, etc. These consumed resources can compete for the resources needed for the user application work and can result in user interface glitches, the device feeling sluggish, slow to respond to touches, and/or the device locking up if there are insufficient resources available to be applied to the user application process. Typically, when an application or process is launched, a fixed set of resources may be applied to the application or process in which the application or process cannot consume more than the assigned fixed set of resources during the execution. Such a mechanism may not be sufficiently flexible under certain circumstances. For example, an application such as photo editing software may temporarily require a large amount of memory to edit an album. If such a large amount of memory exceeds the ordinary memory usage associated with the application, the application may not be able to acquire it, even though the memory resources are widely available in a data processing system.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
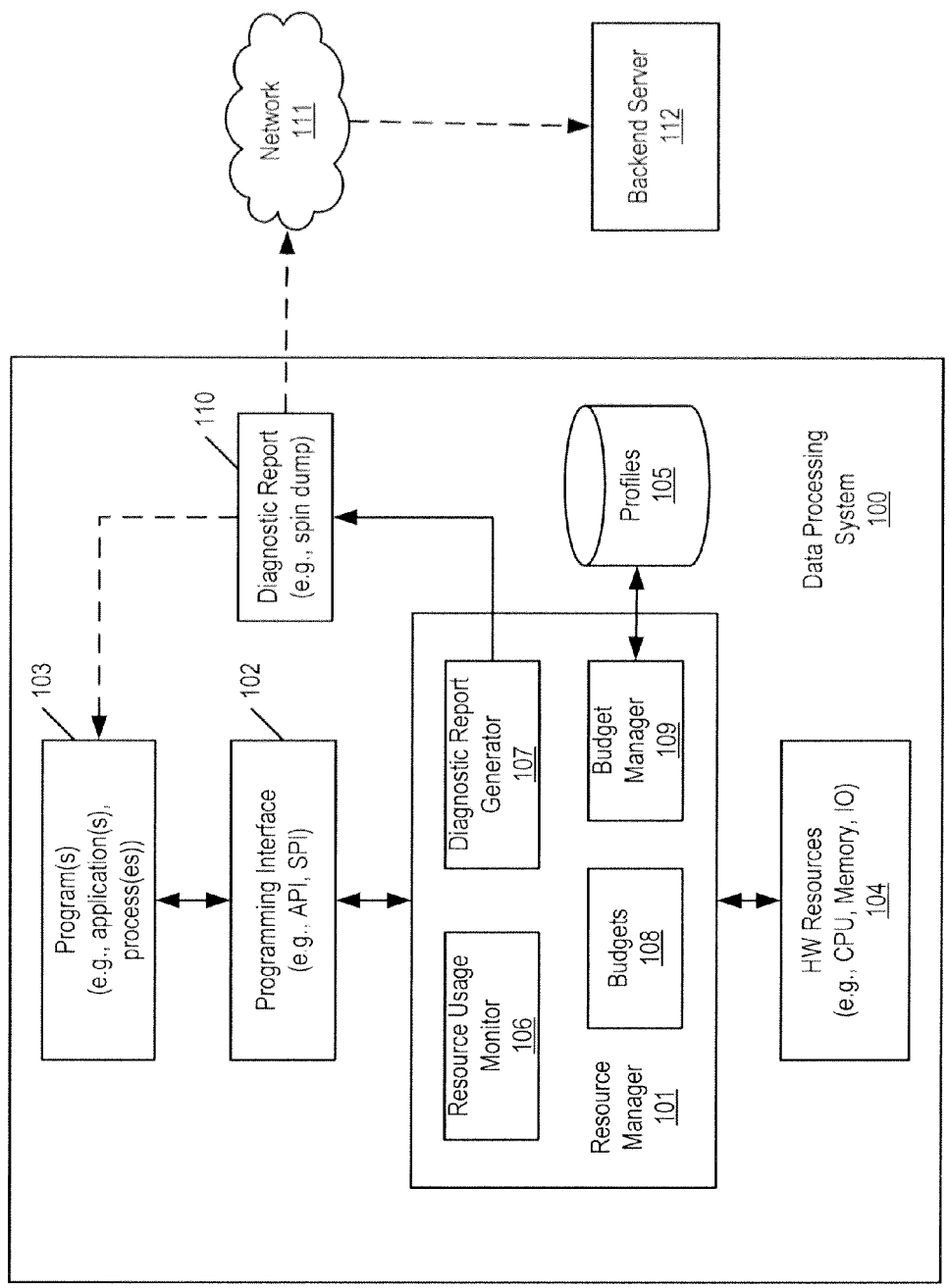
FIG. 1 is a block diagram illustrating a data processing system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for managing resources of a data processing system with dynamic resource budgeting are described herein. According to some embodiments, a framework is designed to allow a program (e.g., an application or a process) to communicate with a resource manager of an operating system of a data processing system to allow the program to temporarily modify a resource budget associated with the program. Such a modification of a resource budget may be performed on a program-wide or per-thread basis, which may be determined based on entitlement of the program or thread. According to one embodiment, a program may call the programming interface to request its resource budget to be modified. In response to the request received via the programming interface, the resource manager determines whether the entitlement of the program allows the program such a modification. If the entitlement of the program allows, the resource manager may modify the resource budget of the program and enforce the modified resource budget against the program going forward.

During the execution of the program, according to one embodiment, a resource usage of the program may be monitored, which may be configurable based on a profile associated with the program, where the profile of the program includes information indicating whether such a resource usage monitoring is enabled, as well as certain entitlements of the program. Alternatively, the profile may further include information specifying certain parameters to be monitored, such as a type of resource, amount of resource, and elapsed time of consumption of resource, etc. If the resource usage of the program exceeds its resource budget, an alert and/or an exception may be generated. In addition, a diagnostic report may be created having information identifying at least the alert and/or exception, as well as the reason or reasons causing the alert and/or exception. The diagnostic report may further identify the type of resources that have been violated and the action or actions performed by the program at the point in time. The diagnostic report may also include certain operating states or statuses of other components of the data processing system at the point in time. The diagnostic report may be saved in a non-volatile storage of the data processing system and possibly also transmitted to a remote device over a network for further analysis.

FIG. 1 is a block diagram illustrating a data processing system according to one embodiment of the invention. System 100 may present any computing device, such as a desktop, laptop, tablet, personal digital assistant (PDA), mobile phone, gaming device, media player, server, etc. Referring to FIG. 1, system 100 includes, but is not limited to, resource manager 101 for managing resources (e.g., hardware and/or software resources) used by programs 103 running within system 100, in particular hardware resources 104. Resource manager 101 may be implemented as part of an operating system of system 100, which may be a variety of operating systems such as OS X or iOS from Apple Inc., a Windows operating system from Microsoft, or other operating systems (e.g., Linux or Unix).

According to one embodiment, each of programs 103 running within system 100 is associated with a resource budget that specifies an amount of resources that can be utilized by the programs during their respective execution. Initially, when a program is developed or installed within system 100, a default resource budget for the program may be determined and stored as part of resource budgets 108 managed by resource budget manager 109. The initial resource budget is referred to herein as a default resource budget. Such a default resource budget may be identical or different amongst the same or different types of programs, which may be specified via their respective program profiles 105.

According to one embodiment, a program profile may include entitlement information of the program indicating what an associated program is entitled to do or acquire during an execution of the program. The entitlement of a program may be determined by an authority entity (e.g., Apple Inc.) associated with system 100. For example, prior to installing a particular program within system 100, the program may be approved or certified by the authority of system 100 and the entitlement and/or default resource budget may also be determined at the time. The entitlement information of a program may be embedded within an executable image of the program such as a header or metadata of the program. For example, an application may be associated with a resource budget specifying that the application can only use 50% of total available CPU time during its normal execution, which may be determined based on the entitlement specified within its profile. Resource budgets 108 and profiles 105 may be stored in a non-volatile memory and loaded into a system memory during the execution of programs 103 by a processor of system 100. Resource budgets 108 and profiles 105 may be implemented as a single database or multiple databases, located either locally or remotely.

According to one embodiment, resource manager 101 further includes a resource usage monitor 106 and a diagnostic report generator 107. Resource usage monitor 106 is configured to monitor resource usages of programs 103 against their respective resource budgets 108. If a resource usage of a program exceeds a limit set by its respective resource budget, an alert or an exception may be generated. For example, a user may be alerted with a warning message displayed, which may provide an opportunity for the user to change the behavior of the program in order to reduce the resource usage by the program. Alternatively, the program may be terminated with or without a warning message to the user. Furthermore, the program may automatically respond to the alert without involving the user. Whether to provide a program with a warning message or to terminate the program in response to a violation of the associated resource budget may be configured via its program profile or entitlement.

In addition, according to one embodiment, a diagnostic report 110 may be optionally generated by diagnostic report generator 107. Such a diagnostic report may be generated regardless whether the program has been terminated. Diagnostic report 110 may include the alert or exception generated in response to the violation of the resource budget. Diagnostic report 110 may further include information describing the overall operating environment at the point in time of the resource usage violation (e.g., one or more reasons that may possibly have caused the resource usage violation), including at least one of: the time the resource usage violation occurred, the amount of resource usage violation (e.g., a percentage over the associated resource budget), types of actions (or function calls) performed by the program, a stack trace or multiple stack traces of the program, overall resource usage by other (or related) components of the system, operating states or statuses of other (or related) components of the system, history of resource usage by the program, etc.

In one embodiment, the monitoring of resource usage of programs may be selectively performed on a per program basis. For example, a program profile of a program may include an attribute or metadata indicating whether the resource usage monitoring is enabled on the program, in which case resource usage monitor 106 will monitor the resource usage of the program. Alternatively, the program profile may further include information specifying certain parameters to be monitored, such as a type of resource, amount of resource, and elapsed time of consumption of resource, etc. A diagnostic report for a program may be generated when the resource monitoring is enabled by the corresponding program profile. Diagnostic report 110 may be stored in a non-volatile storage within system 100 and subsequently transmitted to a backend server 112 over network 111. Backend server 112 may be a remote or centralized management server associated with the authority associated with the system. Alternatively, backend server 112 may be a server associated with the corresponding program (e.g., developers who developed the program). The diagnostic report may be utilized for analysis or bug fixing. Network 111 may be local area network (LAN), a wide area network (WAN) such as the Internet, or a combination of both. Information of diagnostic report 110 may further be fed back (e.g., via programming interface 102) to the corresponding program or programs 103. Programming interface 102 may also be used by a program to enable or disable the resource monitoring performed by resource usage monitor 106 during the execution of the program.

According to one embodiment, programming interface 102 is configured to allow programs 103 to communicate with resource manager 101 or vice versa. Programming interface 102 may be an application programming interface (API), such as, for example, a public API to allow an application such as a third-party application to communicate with resource manager 101. Programming interface 102 may also be an internal programming interface (e.g., special private interface or SPI) to allow a process (e.g., system process such as a daemon) to communicate with resource manager 101. During an execution of a program, the program can communicate with resource manager 101 via programming interface 102 to request to modify its resource budget that is different from its default or current resource budget.

In response to the request, budget manager 109 is configured to examine a profile (e.g., profiles 105) associated with the program to determine whether the program is entitled to modify its resource budget. In one embodiment, the profile of a program includes entitlement information of the program having information indicating whether and by how much the corresponding program is entitled to modify (e.g., temporarily modify) its resource budget, which may be determined by the authority of system 100. If it is determined that the program is entitled to modify its resource budget, budget manager 109 is to modify the resource budget (e.g., resource budgets 108) associated with the program based on the request. Thereafter, resource usage monitor 106 is to monitor the execution of the program in view of the modified or updated resource budget.

For example, a photo application may have a default resource budget that permits it to utilize no more than 50% of total available CPU time during normal operations. When the photo application performs a photo database management operation (e.g., albums configuration), it may require more CPU time (e.g., 100% CPU time) for a short period of time. In this example, the photo application may communicate with resource manager 101 to request more CPU time than its default budget allows. In one embodiment, the request for more CPU time may specify a new amount of resource or resources required and a period of time for consumption of the new amount of resources. If it is determined that the photo application is entitled to modify its resource budget, the resource budget is modified or updated based on the request. Thus, a program dynamically updates its runtime resource consumption profile via programming interface 102.

According to one embodiment, if it is determined that a program is not entitled to modify its resource budget based on its entitlement, the request may be denied. Alternatively, if it is determined that a program is not entitled to modify its resource budget, resource budget manager 109 determines whether the request is to reduce or increase the resource budget from the current resource budget of the program. If so, resource budget manager 109 may allow such a modification (even if the entitlement of the program does not allow) and resource usage monitor 106 enforces the reduced resource budget against the program going forward accordingly.

According to a further embodiment, the request does not need to specify an amount of resources to be modified; it may simply specify or indicate an operating state or role the program is transitioning to. Based on this information, resource budget manager 109 determines a new resource budget for the new operating state or new role. If the program is entitled to modify its resource budget, the resource budget of the program will be updated accordingly. Thus, a program does not need to know or specify the resource budget that is required for the new operating state or role; it is up to budget resource manager 109 to determine the new resource budget based on a set of rules or heuristics (not shown) that specify what resource budget is needed for a particular operating state, a particular role, and/or a particular behavior of a particular type of a program.

For example, a program normally operating in the background can communicate with resource manager 101 via programming interface 102 indicating that the program is transitioning to operate in the foreground without specifying an amount of new resources needed. In response, budget manager 109 determines a new resource budget for such a program which operates in the foreground based on a set of rules and modifies the resource budget associated with the program accordingly. Similarly, when the program subsequently transitions to operate in the background, the program may communicate with resource manager 101 again via programming interface 102 to restore the initial resource budget or further modify the current resource budget to a new resource budget.

In another example, a photo application may communicate with resource manager 101 via programming interface 102 to inform resource manager 101 that the photo application is to perform a photo album management process on a specified amount of photos. In response, budget manager 109 determines an amount of resource or resources required for such a photo process and how long such a resource is required for given amount of photos. Budget manager 109 then modifies the resource budget for the program accordingly.

Note that throughout this application, the term of "resource budget" refers to a certain amount of resources a program can acquire or utilize during an execution of the program, which may be predefined as a default resource budget or dynamically determined or modified during the execution. If the program attempts to request more resources than its resource budget allows, either the request is denied or an alert is generated, or both. The term of "program" refers to an application or related applications, a process or related processes (e.g., system processes), a thread or a stream of related threads (e.g., child threads associated with a parent thread), or the like. The term of "resource" refers to any hardware and/or software resources, such as a central processing unit (CPU), memory, input/output (IO), power consumption, network connections, network bandwidth, rights to access certain libraries, applications/processes, and/or certain (kernel) functionalities of the operating system, etc.

Figure 2:
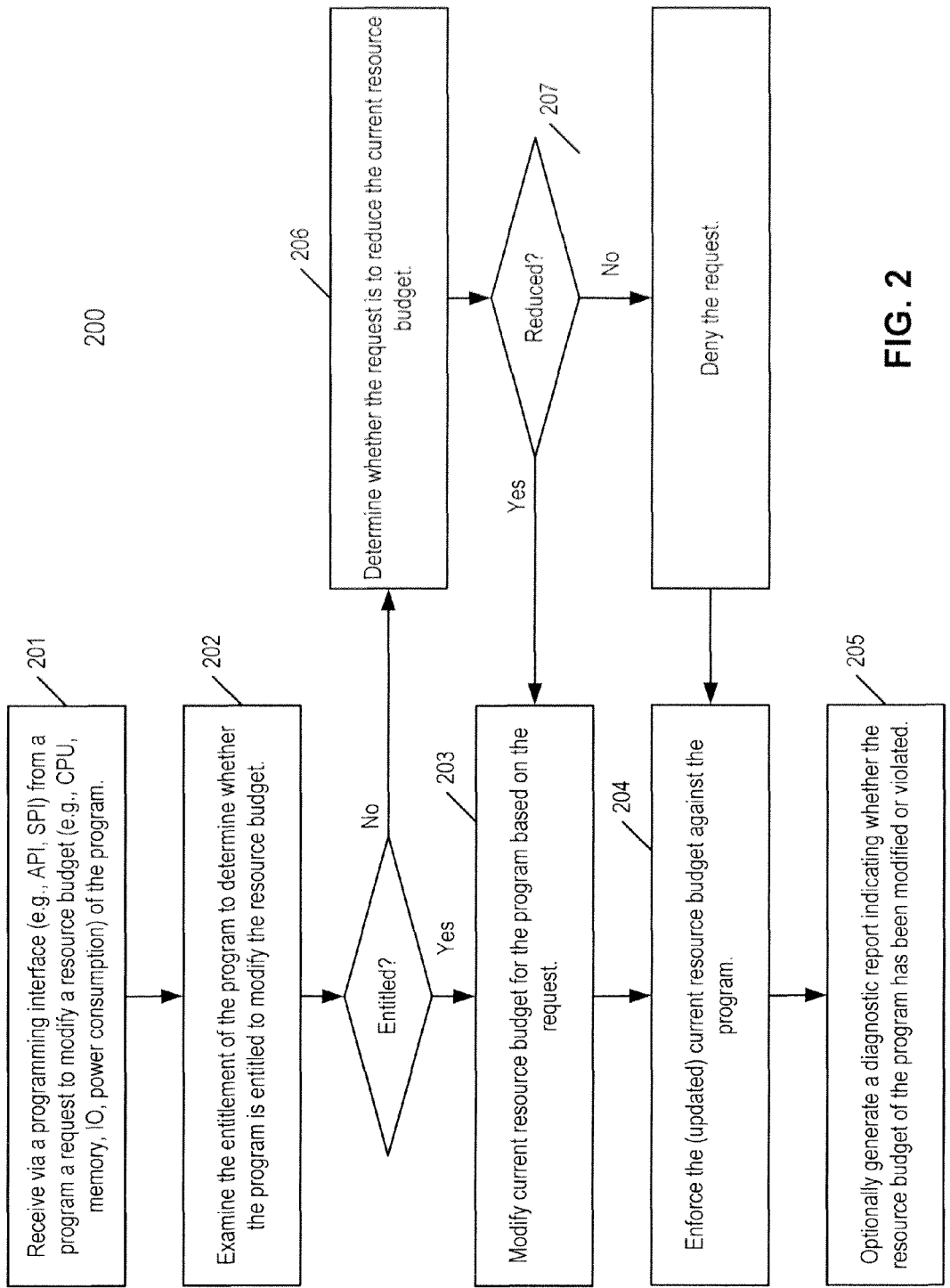
FIG. 2 is a flow diagram illustrating a method for resource management according to one embodiment of the invention.

FIG. 2 is a flow diagram illustrating a method for resource management according to one embodiment of the invention. Method 200 may be performed by processing logic which may include hardware, software, or a combination thereof. For example, method 200 may be performed by resource manager 101 of FIG. 1. Referring to FIG. 2, at block 201, a request is received from a program via a programming interface to modify a resource budget of the program. At block 202, processing logic determines whether the program is entitled to modify the resource budget based on entitlement of the program. If it is determined that the program is entitled to modify the resource budget, at block 203, processing logic modifies the resource budget for the program and the new resource budget may be stored in a non-volatile storage of the system. At block 204, the new resource budget is enforced against the program during the execution of the program. Optionally, at block 205, a diagnostic report may be generated indicating that the resource budget has been violated or modified during the execution. If the program is not entitled to modify its resource budget, at block 206, processing logic determines whether the request is to reduce or increase the current resource budget. If so, at block 203, such a modification is allowed. Otherwise, at block 207, such a request is denied.

Figure 3:
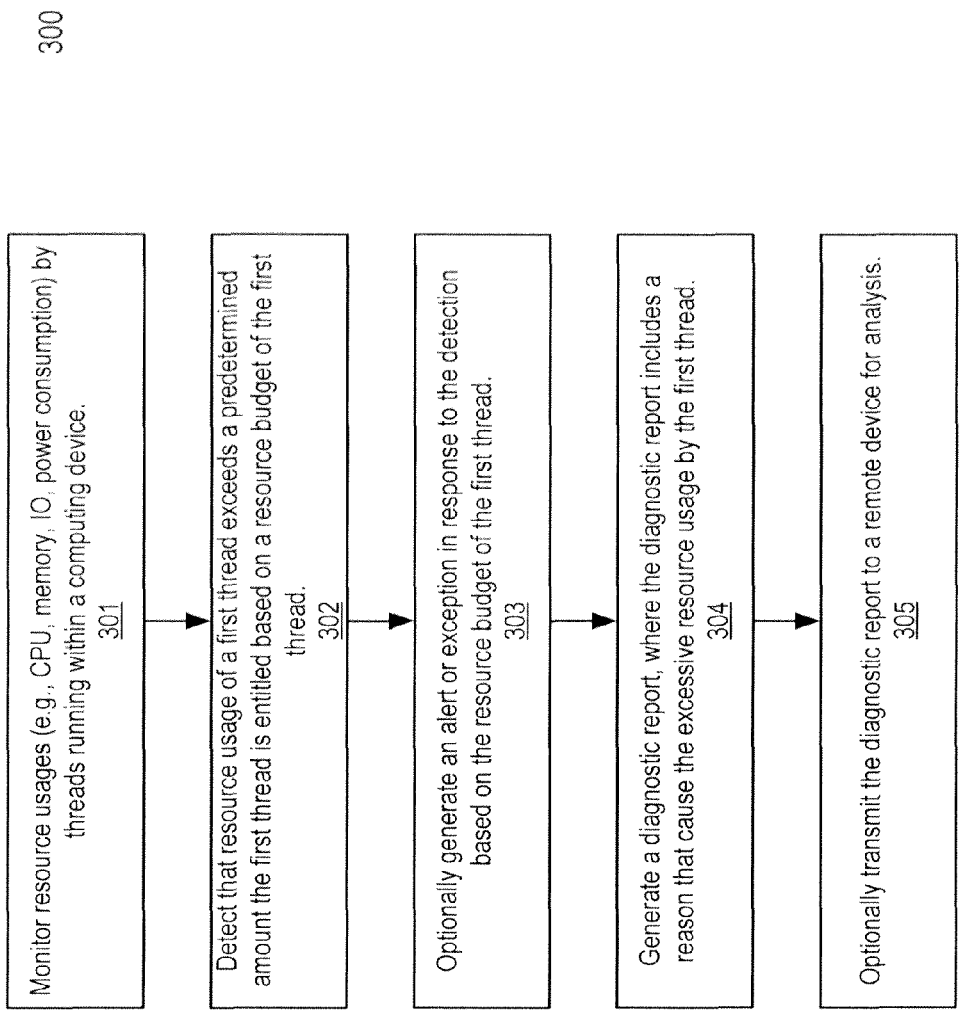
FIG. 3 is a flow diagram illustrating a method for resource management according to another embodiment of the invention.

FIG. 3 is a flow diagram illustrating a method for resource management according to one embodiment of the invention. Method 300 may be performed by processing logic which may include hardware, software, or a combination thereof. For example, method 300 may be performed by resource manager 101 of FIG. 1. Referring to FIG. 3, at block 301, processing logic monitors resource usages by one or more threads representing one or more programs of a computing device. At block 302, it is detected that the resource usage of a first thread exceeds a predetermined amount the first thread is entitled to utilize based on a resource budget associated with the first thread. At block 303, an alert or exception may be triggered in response to the detection. At block 304, a diagnostic report is generated including a reason that caused the excessive resource usage by the first thread. At block 305, the diagnostic report may be optionally transmitted to a remote device over a network for analysis.

Figure 4:
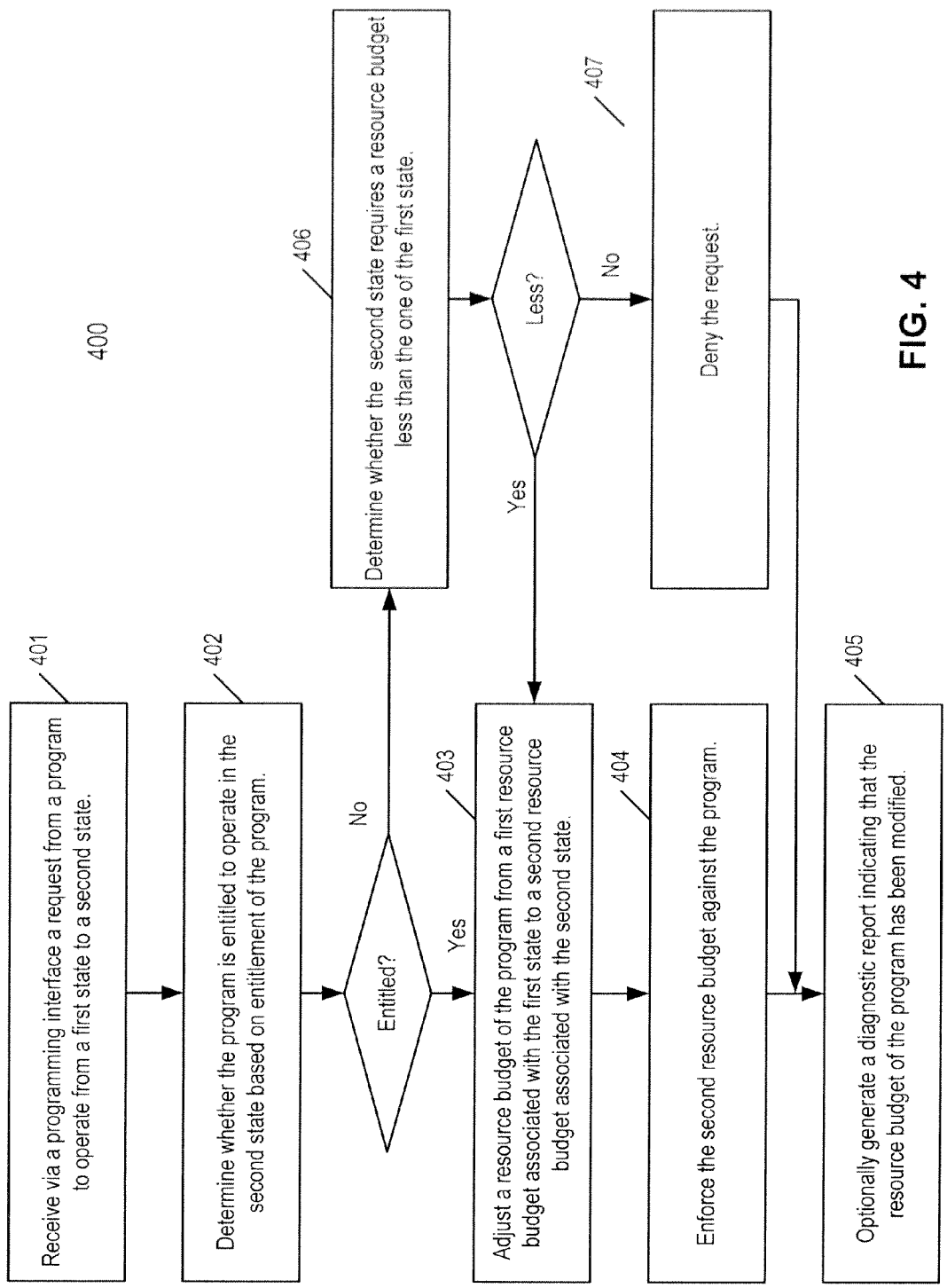
FIG. 4 is a flow diagram illustrating a method for resource management according to another embodiment of the invention.

FIG. 4 is a flow diagram illustrating a method for resource management according to one embodiment of the invention. Method 400 may be performed by processing logic which may include hardware, software, or a combination thereof. For example, method 400 may be performed by resource manager 101 of FIG. 1. Referring to FIG. 4, at block 401, a request is received via a programming interface from a program indicating that the program will transition from a first operating state to a second operating state. At block 402, processing logic determines whether the program is entitled to operate in the second state based on entitlement of the program. If the program is entitled, at block 403, a resource budget of the program is adjusted from a first resource budget associated with the first state to a second resource budget associated with the second state. At block 404, the adjusted resource budget is enforced against the program and optionally a diagnostic report is generated indicating that the resource budget of the program has been modified at block 405. If it is determined that the program is not entitled to operate in the second state, at block 406, processing logic determines whether the second state requires a resource budget less than the one associated with the first state. If so, the resource budget is allowed to be modified at block 403; otherwise at block 407, the request is denied.

Figure 5:
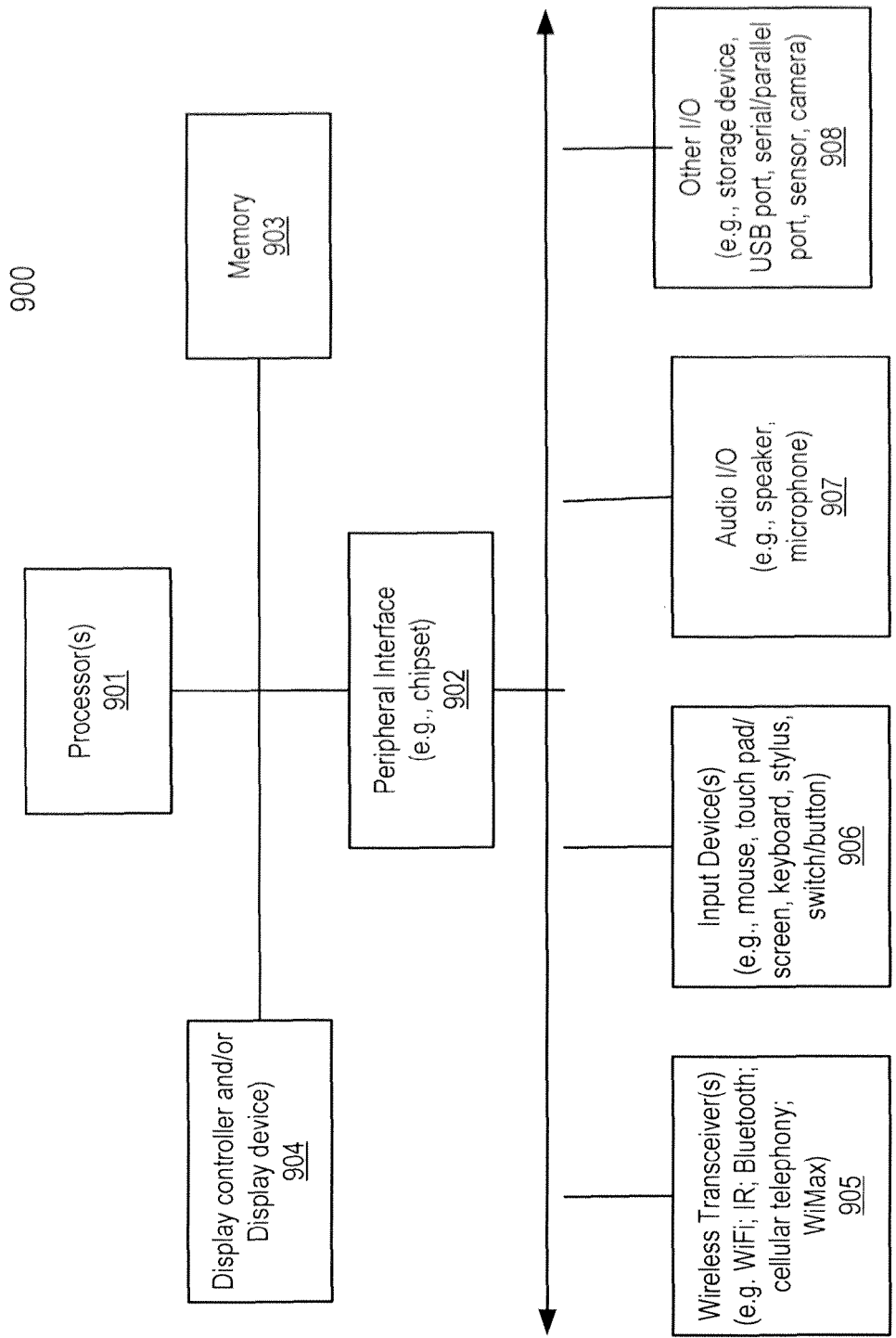
FIG. 5 is a block diagram illustrating an example of a data processing system which may be used with one embodiment of the invention.

FIG. 5 is a block diagram illustrating an example of a data processing system which may be used with one embodiment of the invention. For example, system 900 may represents any of data processing systems described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, a television, or a combination thereof.

In one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips whose functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while system 900 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for resource management of a data processing system, the method comprising:
   receiving, via a programming interface, a request from a program to modify a resource budget assigned to the program, the resource budget specifying an amount of resources of the data processing system the program can utilize during an execution of the program, wherein the program is executed by a processor of the data processing system;
   determining, by a resource manager executed by the processor of the data processing system, whether the program is entitled to modify the resource budget based on an entitlement associated with the program, wherein the entitlement of the program was configured as part of metadata associated with the program, prior to executing the program within the data processing system, and wherein the metadata specifies a type of resources and the amount of the resources the program can utilize;
   modifying the resource budget for the program if it is determined the program is entitled to modify the resource budget; and
   enforcing the modified resource budget against the program during the execution of the program.

2. The method of claim 1, wherein the entitlement of the program was configured prior to installing the program within the data processing system, and wherein the entitlement of the program includes information indicating whether the program is allowed to modify its resource budget.

3. The method of claim 2, wherein the entitlement of the program further includes information specifying a type resource, an amount of resource, and a length of time for resource consumption that the program is entitled to.

4. The method of claim 1, further comprising:
   determining whether the request is to reduce the resource budget, if the program is not entitled to modify the resource budget based on the entitlement of the program;
   allowing the resource budget to be modified if the request is to reduce the resource budget; and
   denying the request if the request is to increase the resource budget.

5. The method of claim 1, wherein the request includes a type of a resource of the data processing system, an amount of the resource, and a period of time during which the requested resource will be utilized.

6. The method of claim 1, wherein enforcing the modified resource budget comprises:
   monitoring resource usage by the program in view of the modified resource budget to determine whether the resource usage exceeds the modified resource budget;
   generating an alert if the resource usage exceeds the modified resource budget during the execution of the program.

7. The method of claim 6, further comprising generating a diagnostic report including the alert indicating that the resource usage of the program exceeds the modified resource budget and a reason for causing the excessive resource usage.

8. The method of claim 1, wherein the request indicates that the program is transitioning from a first operating state to a second operating state, wherein the method further comprises automatically determining a new resource budget that enables the program to operate in a second operating state based on a set of one or more rules.

9. A non-transitory computer-readable medium having instructions stored therein, which when executed by a processor, cause the processor to perform a method for resource management of a data processing system, the method comprising:
   receiving, via a programming interface, a request from a program to modify a resource budget assigned to the program, the resource budget specifying an amount of resources of the data processing system the program can utilize during an execution of the program, wherein the program is executed by a processor of the data processing system;

determining, by a resource manager executed by the processor, whether the program is entitled to modify the resource budget based on an entitlement associated with the program, wherein the entitlement of the program was configured as part of metadata associated with the program, prior to executing the program within the data processing system, and wherein the metadata specifies a type of resources and the amount of the resources the program can utilize;

modifying the resource budget for the program if it is determined the program is entitled to modify the resource budget; and enforcing the modified resource budget against the program during the execution of the program.

10. The non-transitory computer-readable medium of claim 9, wherein the entitlement of the program was configured prior to installing the program within the data processing system, and wherein the entitlement of the program includes information indicating whether the program is allowed to modify its resource budget.

11. The non-transitory-readable medium of claim 10, wherein the entitlement of the program further includes information specifying a type resource, an amount of resource, and a length of time for resource consumption that the program is entitled to.

12. The non-transitory computer-readable medium of claim 9, wherein the method further comprises:

determining whether the request is to reduce the resource budget, if the program is not entitled to modify the resource budget based on the entitlement of the program;

allowing the resource budget to be modified if the request is to reduce the resource budget; and denying the request if the request is to increase the resource budget.

13. The non-transitory computer-readable medium of claim 9, wherein the request includes a type of a resource of the data processing system, an amount of the resource, and a period of time during which the requested resource will be utilized.

14. The non-transitory computer-readable medium of claim 9, wherein enforcing the modified resource budget comprises:

monitoring resource usage by the program in view of the modified resource budget to determine whether the resource usage exceeds the modified resource budget;

generating an alert if the resource usage exceeds the modified resource budget during the execution of the program.

15. The non-transitory computer-readable medium of claim 14, wherein the method further comprises generating a diagnostic report including the alert indicating that the resource usage of the program exceeds the modified resource budget and a reason for causing the excessive resource usage.

16. The non-transitory computer-readable medium of claim 9, wherein the request indicates that the program is transitioning from a first operating state to a second operating state, wherein the method further comprises automatically determining a new resource budget that enables the program to operate in a second operating state based on a set of one or more rules.

17. A data processing system, comprising:
a processor;
a programming interface executed by the processor to receive a request from a program to modify a resource budget assigned to the program, the resource budget specifying an amount of resources of the data processing system the program can utilize during an execution of the program, wherein the program is executed by the processor; and a resource budget manager coupled to the programming interface to determine whether the program is entitled to modify the resource budget based on an entitlement associated with the program, wherein the entitlement of the program was configured as part of metadata associated with the program, prior to executing the program within the data processing system, and wherein the metadata specifies a type of resources and the amount of the resources the program can utilize, modify the resource budget for the program if it is determined the program is entitled to modify the resource budget, and enforce the modified resource budget against the program during the execution of the program.

18. The system of claim 17, wherein the entitlement of the program was configured prior to installing the program within the data processing system, and wherein the entitlement of the program includes information indicating whether the program is allowed to modify its resource budget.

19. The system of claim 18, wherein the entitlement of the program further includes information specifying a type resource, an amount of resource, and a length of time for resource consumption that the program is entitled to.

20. The system of claim 17, wherein the resource budget manager is further configured to:

determine whether the request is to reduce the resource budget, if the program is not entitled to modify the resource budget based on the entitlement of the program, allow the resource budget to be modified if the request is to reduce the resource budget, and deny the request if the request is to increase the resource budget.

21. The system of claim 17, wherein the request includes a type of a resource of the data processing system, an amount of the resource, and a period of time during which the requested resource will be utilized.

22. The system of claim 17, further comprising a resource monitor to monitor resource usage by the program in view of the modified resource budget to determine whether the resource usage exceeds the modified resource budget, and to generate an alert if the resource usage exceeds the modified resource budget during the execution of the program.

23. The system of claim 22, further comprising a diagnostic report generator to generate a diagnostic report including the alert indicating that the resource usage of the program exceeds the modified resource budget and a reason for causing the excessive resource usage.

24. The system of claim 17, wherein the request indicates that the program is transitioning from a first operating state to a second operating state, wherein the resource budget manager is to automatically determine a new resource budget that enables the program to operate in a second operating state based on a set of one or more rules.

* * * * *